US007846226B2

(12) United States Patent
Leininger et al.

(10) Patent No.: US 7,846,226 B2
(45) Date of Patent: Dec. 7, 2010

(54) APPARATUS FOR COOLING AND SCRUBBING A FLOW OF SYNGAS AND METHOD OF ASSEMBLING

(75) Inventors: Thomas Frederick Leininger, Chino Hills, CA (US); Allyson Joy Jimenez-Huyke, Houston, TX (US); Judeth Brannon Corry, Manvel, TX (US); Fulton Jose Lopez, Clifton Park, NY (US); Aaron John Avagliano, Houston, TX (US); John Saunders Stevenson, Yorba Linda, CA (US); Lien-Yan Chen, Spring, TX (US)

(73) Assignee: General Electric Company, Schenectady, NY (US)

( * ) Notice: Subject to any disclaimer, the term of this patent is extended or adjusted under 35 U.S.C. 154(b) by 441 days.

(21) Appl. No.: 12/030,677

(22) Filed: Feb. 13, 2008

(65) Prior Publication Data

US 2009/0199474 A1 Aug. 13, 2009

(51) Int. Cl.
*C01B 3/24* (2006.01)
*C10J 3/76* (2006.01)

(52) U.S. Cl. .................... 48/67; 48/197 R; 48/206; 48/61; 48/127.1; 48/127.3; 48/127.9; 48/128; 48/207; 48/198.3; 48/204; 122/511; 122/32; 165/172; 165/162

(58) Field of Classification Search .............. 48/67, 48/197 R, 204, 206–207, 127.1, 127.3, 127.9, 48/128, 61, 198.3; 122/511, 32; 165/162, 165/172
See application file for complete search history.

(56) References Cited

U.S. PATENT DOCUMENTS 3,788,281 A 1/1974 Van Lookeren Campagne

| 4,080,424 | A | 3/1978 | Miller et al. |
| 4,474,584 | A | 10/1984 | Koog |
| 4,487,611 | A | 12/1984 | Ziegler |
| 4,513,694 | A | 4/1985 | Wiemer |

(Continued)

FOREIGN PATENT DOCUMENTS

| DE | 102006031816 A1 | 1/2008 |
| EP | 0227259 A1 | 7/1987 |
| EP | 1207132 A1 | 5/2002 |
| EP | 1475429 A1 | 11/2004 |
| GB | 2093175 A | 8/1982 |
| GB | 2135434 A | 8/1984 |

OTHER PUBLICATIONS

International Search Report, PCT/US2008/066721, dated Jun. 26, 2009, pp. 6.

(Continued)

*Primary Examiner*—Alexa D. Neckel
*Assistant Examiner*—Kaity V. Handal
(74) *Attorney, Agent, or Firm*—Armstrong Teasdale LLP

(57) ABSTRACT

A method of assembling a spray quench apparatus is provided. The method includes coupling a first end of an exit tube to a quench chamber such that the exit tube end is in flow communication with the quench chamber, coupling at least one spray nozzle to an opposite second end of the exit tube such that water emitted from the spray nozzle fills the exit tube and forms a film of water across an inner surface of the exit tube, coupling a water source to the quench chamber for providing a substantially continuous water film along an inner surface of the quench chamber, and coupling at least one discharge apparatus to the quench chamber for providing water spray into the quench chamber, wherein the water of the water film and water sprays drains into a water sump.

28 Claims, 10 Drawing Sheets

U.S. PATENT DOCUMENTS

| | | | |
|---|---|---|---|
| 4,581,899 | A | 4/1986 | von Klock et al. |
| 4,605,423 | A | 8/1986 | Koog |
| 4,674,530 | A | 6/1987 | Bickford |
| 4,705,542 | A | 11/1987 | Gilmer |
| 4,707,163 | A | 11/1987 | Gudymov et al. |
| 5,137,550 | A | 8/1992 | Hegarty et al. |
| 6,090,356 | A | 7/2000 | Jahnke et al. |
| 6,613,127 | B1 | 9/2003 | Galloway et al. |
| 2003/0083391 | A1 | 5/2003 | Jahnke et al. |
| 2004/0118126 | A1 | 6/2004 | Ong et al. |
| 2007/0119577 | A1 | 5/2007 | Kraft et al. |
| 2007/0129450 | A1 | 6/2007 | Barnicki et al. |
| 2007/0137107 | A1 | 6/2007 | Barnicki |
| 2008/0041572 | A1 | 2/2008 | Wessel et al. |

OTHER PUBLICATIONS

Chiesa, Paolo et al., Co-production of hydrogen, electricity and CO2 from coal with commercially ready technology. Part A: Performance and emissions, International Journal of Hydrogen Energy, dated Jul. 1, 2005, vol. 30, No. 7, pp. 21.

International Search Report, dated Apr. 6, 2009, for copending PCT patent application No. PCT/US2009/031229 (5 pages).

APPARATUS FOR COOLING AND SCRUBBING A FLOW OF SYNGAS AND METHOD OF ASSEMBLING

BACKGROUND OF THE INVENTION

The present invention relates generally to gasification power systems, such as those used in a power plant, and more specifically, to gasifiers used in integrated gasification combined cycle (IGCC) power systems.

At least some known combined cycle power systems include a gasification system that is integrated with at least one power-producing turbine system. For example, known gasifiers convert a mixture of fuel, air or oxygen, steam, and/or limestone into an output of partially combusted gas, sometimes referred to as "syngas". The hot syngas is cooled and cleaned to remove contaminants and then supplied to the combustor of a gas turbine engine, which powers a generator that supplies electrical power to a power grid. Exhaust from at least some known gas turbine engines is supplied to a heat recovery steam generator that heats boiler feed water and generates steam for driving a steam turbine. Power generated by the steam turbine also drives an electrical generator that provides electrical power to the power grid.

In at least some gasifiers used in gasification systems, the syngas that is generated in the reaction chamber is very hot (>2200° F.) and must be cooled before it can be handled easily in downstream process equipment. The syngas also contains entrained particles which must be removed to prevent plugging in downstream equipment. For power generation applications, at least some known gasifiers accomplish this cooling and particle removal using a two-step process. In the first step, the gas is cooled by indirect heat exchange with boiler feed water in two syngas coolers. The first syngas cooler, called a radiant syngas cooler, is coupled to the bottom of the reaction chamber, and it cools the gas to between approximately 950° F. and approximately 1350° F. The second syngas cooler, called a convective syngas cooler, further cools the gas to between approximately 700° F. and approximately 750° F. At such temperatures, the syngas may be handled in conventional steel equipment. After cooling the syngas using the syngas coolers, the second step, removing the fine particulates entrained in the syngas, is accomplished in another vessel called a syngas scrubber. The syngas scrubber provides three stages of water-syngas contact, which remove virtually all of the particulates.

In at least some combined cycle power applications, the convective syngas cooler is removed from the system leaving only a radiant syngas cooler to cool the syngas. This so-called radiant-only configuration is used in at least some combined cycle applications for two reasons. First, removal of the convective syngas cooler reduces the cost of the plant. Second, in commercial practice, the convective syngas cooler has been found to be prone to plugging, which significantly reduces plant on-stream time. But, removal of the convective syngas cooler presents two problems. First, the approximately 950-1350° F. temperature at the exit of the radiant syngas cooler is still too high to allow the syngas to be handled in conventional steel piping and equipment. Second, at that temperature, some of the entrained solids are still sticky, and they can plug the piping connecting the radiant syngas cooler to the syngas scrubber. As such, removing the convective syngas cooler to create a radiant-only syngas cooling configuration is not a simple matter of removing the convective syngas cooler and connecting the scrubber directly to the outlet of the radiant syngas cooler. To do so would require, at a minimum, the scrubber vessel to be manufactured from special high temperature steel alloys and would invite the possibility of solids plugging within the scrubber vessel itself. An apparatus is needed to cool the syngas by quenching with water sprays and to remove entrained particles while avoiding concerns about plugging. Moreover, an apparatus is needed to simplify the equipment required for syngas cooling and particle removal by eliminating the need for a separate syngas scrubber vessel.

BRIEF DESCRIPTION OF THE INVENTION

In one aspect, a method of assembling a spray quench apparatus is provided. The method includes coupling a first end of at least one exit tube to a quench chamber such that the exit tube end is in flow communication with the quench chamber, coupling at least one spray nozzle to an opposite second end of the at least one exit tube such that water emitted from the at least one spray nozzle fills the at least one exit tube and forms a film of water across an inner surface of the at least one exit tube, coupling a water source to the quench chamber for providing a substantially continuous water film along an inner surface of the quench chamber, and coupling at least one discharge apparatus to the quench chamber for providing water spray into the quench chamber, wherein the water of the water film and water sprays drains into a water sump.

In another aspect, a spray quench apparatus is provided. The spray quench apparatus includes a chamber, at least one spray apparatus coupled to the chamber, at least one water distribution apparatus coupled to the chamber for providing a layer of liquid across an inner surface of the chamber, at least one hollow cylinder including a first end and an opposite second end, wherein the first end is coupled to the chamber such that an opening in the first end enables syngas to exit the chamber through the hollow cylinder, and at least one spray nozzle coupled to the second end of the hollow cylinder for providing a water spray that fills the hollow cylinder and a water film across an inner surface of the hollow cylinder, and wherein the water of the water sprays and the water film drains into a water sump positioned at a bottom of the chamber.

In a further aspect, a gasifier includes a combustion chamber and a spray quench chamber coupled to the combustion chamber. The spray quench chamber includes at least one water distribution apparatus for distributing a substantially continuous film across an inner surface of the spray quench chamber, at least one spray nozzle, and at least one exit tube having a first end and an opposite second end, wherein the first end is coupled to a sidewall of the spray quench chamber.

DETAILED DESCRIPTION OF THE INVENTION

Figure 1:
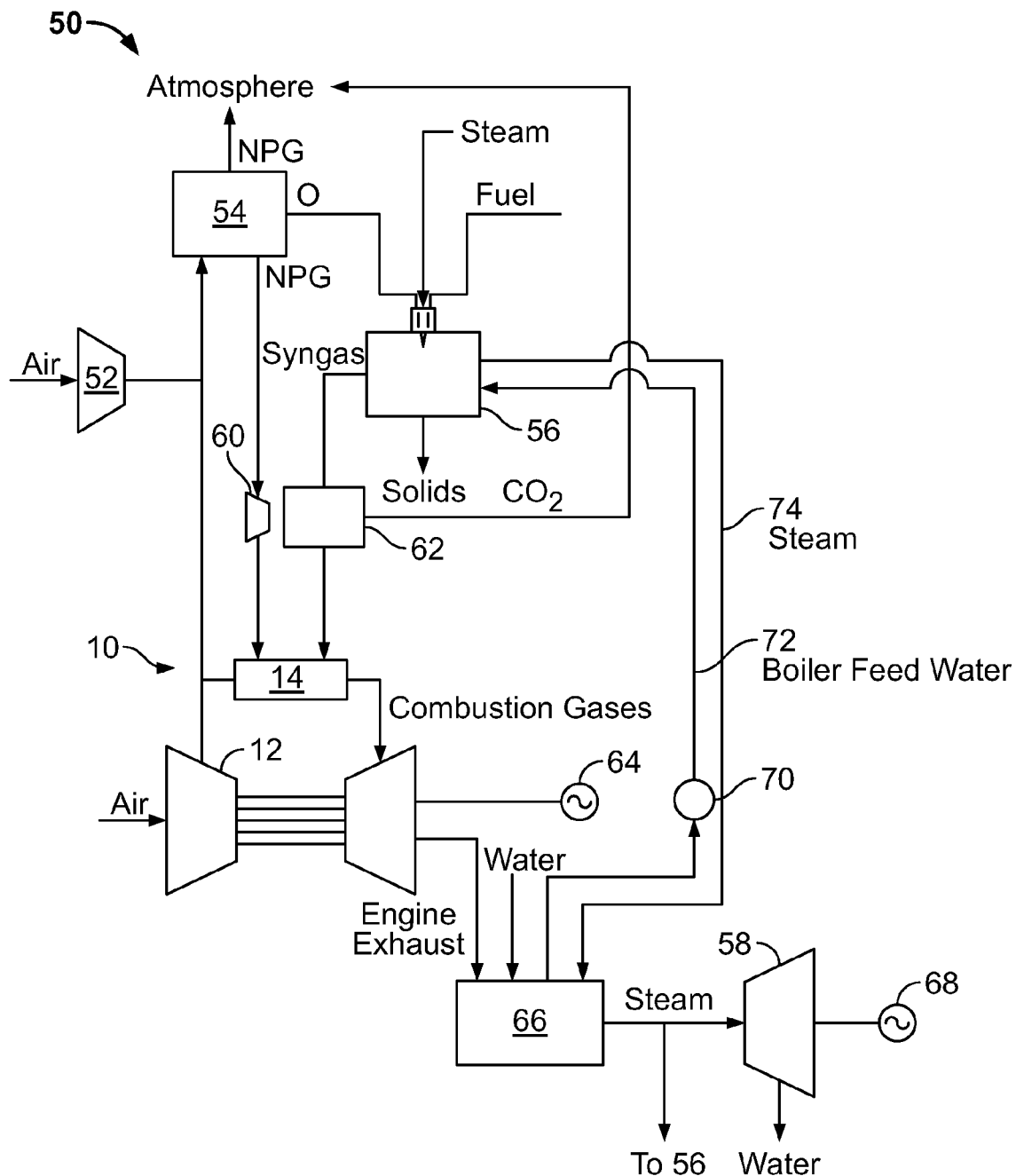
FIG. 1 is a block diagram of an exemplary known combined cycle power system.

FIG. 1 is a schematic diagram of an exemplary known integrated gasification combined cycle power system 50, such as those used in a power plant. System 50 generally includes a main air compressor 52, an air separation unit 54 coupled in flow communication to compressor 52, a gasifier 56 coupled in flow communication to air separation unit 54, a gas turbine engine 10 coupled in flow communication to gasifier 56, and a steam turbine 58.

In operation, compressor 52 compresses ambient air that is channeled to air separation unit 54. In some embodiments, in addition to compressor 52 or alternatively, compressed air from gas turbine engine compressor 12 is supplied to air separation unit 54. Air separation unit 54 uses the compressed air to generate oxygen for use by gasifier 56. More specifically, air separation unit 54 separates the compressed air into separate gas flows of oxygen ($O_2$) and a gas by-product, sometimes referred to as "process gas." The process gas generated by air separation unit 54 includes nitrogen and is hereinafter referred to as "nitrogen process gas" (NPG). The NPG may also include other gases such as, but not limited to, oxygen and/or argon. For example, in some embodiments, the NPG includes between about 95% and about 100% nitrogen. The $O_2$ flow is channeled to gasifier 56 for use in generating partially combusted gases, referred to herein as "syngas," for use by gas turbine engine 10 as fuel. In some known systems 50, at least some of the NPG flow is vented to the atmosphere from air separation unit 54. Moreover, in some known systems 50, some of the NPG flow is injected into a combustion zone (not shown) within gas turbine engine combustor 14 to facilitate controlling emissions of engine 10 and more specifically to facilitate reducing combustion temperature and reducing nitrous oxide emissions from engine 10. In the exemplary embodiment, system 50 includes a compressor 60 for compressing the NPG flow before being injected into the combustion zone.

Gasifier 56 converts a mixture of fuel, $O_2$ supplied by air separation unit 54, steam, and/or limestone into an output of syngas for use by gas turbine engine 10 as fuel. Although gasifier 56 may use any fuel, in some known systems 50, gasifier 56 uses coal, petroleum coke, residual oil, oil emulsions, tar sands, refinery bottoms, biomass, and/or other similar fuels. In some known systems 50, the syngas generated by gasifier 56 includes carbon dioxide ($CO_2$). In the exemplary embodiment, syngas generated by gasifier 56 is cleaned in a clean-up device 62 before being channeled to gas turbine engine combustor 14 for combustion thereof. The $CO_2$ may be separated from the syngas during clean-up and, in some known systems 50, may be vented to the atmosphere. Gas turbine engine 10 drives a generator 64 that supplies electrical power to a power grid (not shown). Exhaust gases from gas turbine engine 10 are channeled to a heat recovery steam generator 66 that heats boiler feed water and generates steam for driving steam turbine 58. Power generated by steam turbine 58 drives an electrical generator 68 that provides additional electrical power to the power grid. In some known systems 50, steam from heat recovery steam generator 66 is supplied to gasifier 56 for generating syngas.

Furthermore, in the exemplary embodiment, system 50 includes a pump 70 that supplies hot boiler feed water 72 from heat recovery steam generator 66 to a radiant syngas cooler (not shown) within gasifier 56 to facilitate cooling the syngas flowing within gasifier 56. Hot boiler feed water 72 is channeled through the radiant syngas cooler wherein water 72 is converted to steam 74. Steam 74 is then returned to heat recovery steam generator 66 for use within gasifier 56 or steam turbine 58.

Figure 2:
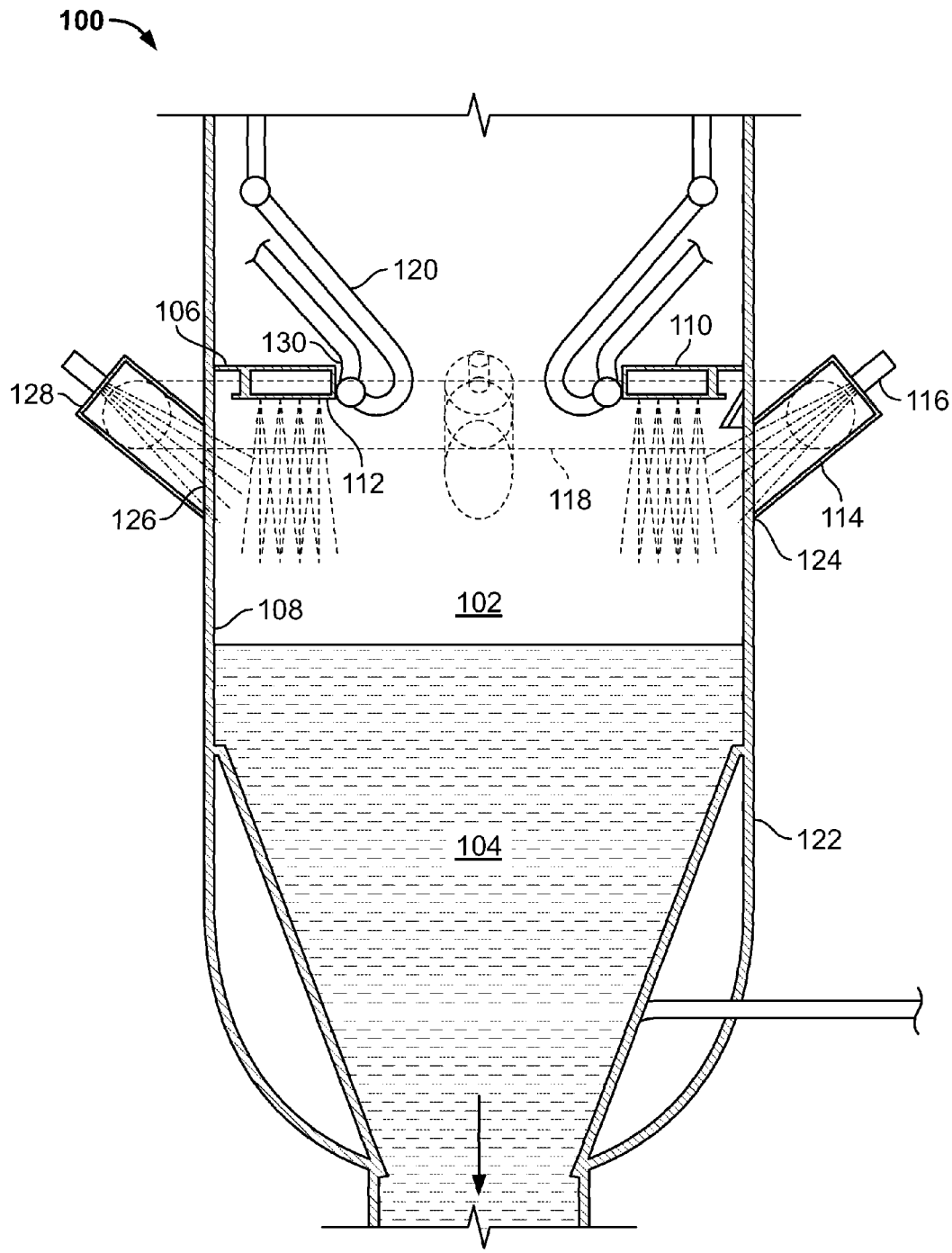
FIG. 2 is a schematic view of an exemplary spray quench that may be used with the power system shown in FIG. 1.
Figure 3:
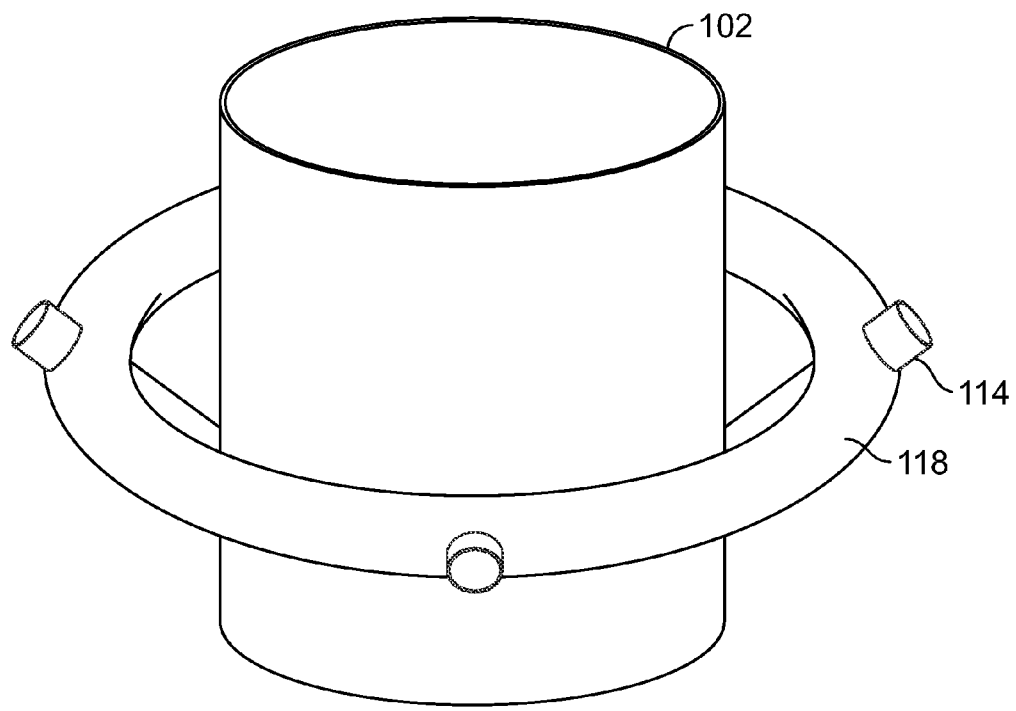
FIG. 3 is a perspective view of the spray quench shown in FIG. 2.
Figure 4:
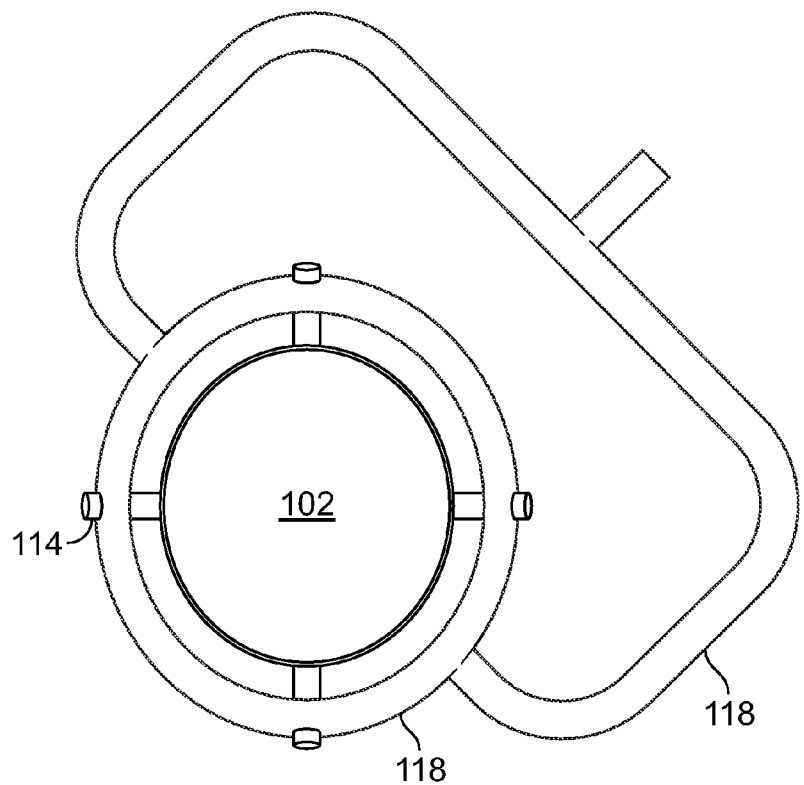
FIG. 4 is a plan view of the spray quench shown in FIG. 2.

FIG. 2 is a schematic view of an exemplary spray quench 100 that may be used with gasifier 56 (shown in FIG. 1). More specifically, FIG. 2 shows a lower portion of a radiant syngas cooler 122 that may be used with gasifier 56. Radiant syngas cooler 122 includes a spray quench chamber 102 and a large pool of water or "water sump" 104 located within radiant syngas cooler 122. A plurality of boiler tubes 120 forms a cone which channels syngas from a chamber (not shown) above downwards into spray quench chamber 102. In an alternative embodiment, boiler tubes 120 do not form a cone but, rather, a separate cone is positioned between radiant syngas cooler 122 and spray quench chamber 102. Further, the cone may be, for example, a refractory-lined metal shelf or any other apparatus suitable for directing high temperature, slag-laden syngas into spray quench chamber 102. In the exemplary embodiment, quench ring 106 is coupled to spray quench chamber 102 at approximately the same level as the bottom of boiler tubes 120. Quench ring 106 distributes a continuous film of water around the inner surface 108 of spray quench chamber 102. The film of water, which drains into water sump 104, ensures that inner surface 108 remains wet to prevent slag from depositing on inner surface 108. Spray ring 110 is coupled to quench ring 106, leaving an annular gap 130 between spray ring 110 and the bottom of boiler tubes 120. Annular gap 130 provides a means for boiler tubes 120 to move freely as a result of thermal expansion. Spray ring 110 includes a plurality of spray nozzles 112. Water discharged from spray nozzles 112 provides additional syngas cooling and facilitates particle removal from the syngas. The water sprays also prevent deposits on inner surface 108 by keeping particulates away from the top of spray quench chamber 102. Spray quench 100 also includes a plurality of exit tubes 114 spaced substantially equally about the outer periphery of spray quench chamber 102. Spray quench 100 may include between one and eight exit tubes 114. In the exemplary embodiment, spray quench 100 includes four exit tubes 114. Exit tubes 114 are coupled to a sidewall 124 of spray quench chamber 102 and are oriented at a positive angle of elevation to facilitate draining any water inside exit tubes 114 through an open first end 126 into water sump 104 for further processing. At a second end 128 of each exit tube 114, a spray nozzle 116 is coupled and the second end 128 of the exit tube 114 is substantially sealed around spray nozzle 116. Alternatively, multiple spray nozzles 116 may be coupled to the upper end of each exit tube 114. A high-pressure water source (not shown) is coupled in flow communication with each spray nozzle 116 to provide a continuous flow of water. Each spray nozzle 116 is oriented to spray water downwards through exit tube 114 and against the flow of the syngas. In the exemplary embodiment, each exit tube 114 is coupled to a ring-shaped manifold 118, as shown in FIGS. 3 and 4. In an alternative embodiment, manifold 118 is not ring shaped. For example, two exit tubes 114 may be coupled together to form a first conduit and the two remaining exit tubes 114 may be coupled together to form a second conduit, with the two conduits joining to form a final syngas conduit.

During operation, hot syngas flowing through the conduit formed by boiler tubes 120 contains both fine particulates and larger particles or droplets of partially solidified molten slag. With their larger momentum, the slag droplets fall into water sump 104 where they are rapidly quenched, solidified, and captured. The syngas and fine particulates form an expanding jet which mixes with the sprays discharged from the spray ring nozzles 112 as the syngas flows outward from the center of quench chamber 102. Spray ring nozzles 112 facilitate cooling of the gas by evaporating water into the syngas. The sprays also facilitate the removal of the particulates from the syngas, forcing the particles into water sump 104. In the exemplary embodiment, the partially cooled and partially scrubbed syngas then flows into exit tubes 114. The high density, high intensity sprays from spray nozzle 116 within each exit tube 114 complete both the cooling and scrubbing of the syngas. The cooled and scrubbed syngas is then collected in manifold 118 and is channeled downstream for further processing. Moreover, annular gap 130 is either continuously or intermittently purged with an inert gas such as, but not limited to, nitrogen, from a gas source (not shown). The flow rate of the purge gas downwards into spray quench chamber 102 ensures that syngas, particulate matter, and moisture do not pass upwards into annular gap 130 between boiler tubes 120 and a wall of radiant syngas cooler 122. As such, purging prevents fouling and/or plugging of annular gap 130, and minimizes corrosion in annular gap 130.

Figure 5:
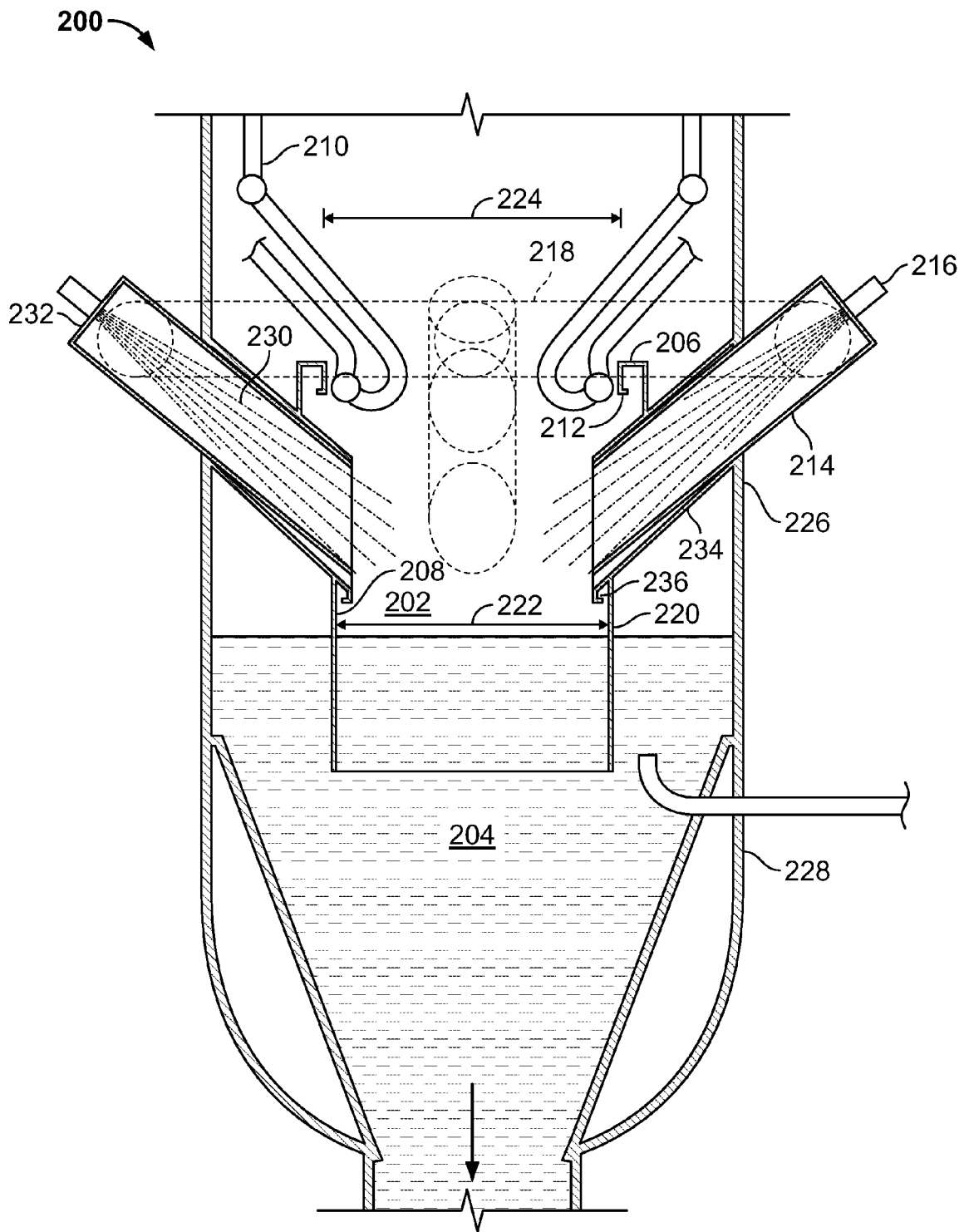
FIG. 5 is a schematic view of an alternative spray quench that may be used with the power system shown in FIG. 1.

In the above-described exemplary embodiment, a large amount of water is discharged through the water sprays and through the quench ring that is used to maintain a continuous film of water on the inner surface of the spray quench chamber. FIG. 5 illustrates a schematic view of an alternative embodiment of a spray quench chamber 200 that reduces the amount of water required to ensure that all surfaces of the chamber remain wet at all times. More specifically, FIG. 5 shows a lower portion of a radiant syngas cooler 122 that may be used with gasifier 56 (shown in FIG. 1). Radiant syngas cooler 122 includes a spray quench chamber 202 and a water sump 204. A plurality of boiler tubes 210 forms a cone which channels syngas from a chamber (not shown) above downwards into spray quench chamber 202. In an alternative embodiment, boiler tubes 210 do not form a cone but, rather, a separate cone is positioned between radiant syngas cooler 122 and spray quench chamber 202. Moreover, the cone may be constructed of, for example, a refractory-lined metal shelf or any other material or materials suitable for directing high temperature, slag-laden syngas into spray quench chamber 202. In the exemplary embodiment, the inner surface 108 of spray quench chamber 102 (as shown in FIG. 1) is effectively moved radially inwards by using a dip tube 220 that has a diameter 222 that is approximately equal to the diameter 224 of the opening at the bottom of the boiler tubes 210. A sleeve 234 is coupled to a sidewall 226 of radiant syngas cooler 228 and further coupled to dip tube 220. In the exemplary embodiment, an upper quench ring 206 and a lower quench rings 236 are coupled to sleeve 234. Quench rings 206 and 236 work in combination to maintain a continuous film of water on an inner surface 208 of dip tube 220. The film of water, which drains into water sump 204, ensures that inner surface 208 remains wet to prevent slag from depositing on inner surface 208.

In the exemplary embodiment, spray quench 200 also includes a plurality of exit tubes 214 spaced substantially equally about the outer periphery of spray quench chamber 202. Spray quench 200 may include between one and eight exit tubes 214. In the exemplary embodiment, spray quench 200 includes four exit tubes 214. The length of the exit tubes 214 ensures the exit tubes 214 extend through sleeve 234. Exit tubes 214 are coupled to sidewall 226 and further to sleeve 234. As a result, boiler tubes 210 may move relative to dip tube 220 through thermal expansion, for example. An expansion gap 212 defined between boiler tubes 210 and dip tube 220 enables boiler tubes 210 to thermally expand and contract without interfering with dip tube 220. Further, exit tubes 214 are oriented at a positive angle of elevation to facilitate draining any water inside exit tubes 214 through an open first end 230 into water sump 204 for further processing. At a second end 232 of each exit tube 214, a spray nozzle 216 is coupled and the second end 232 of the exit tube 214 is substantially sealed around spray nozzle 216. Alternatively, multiple spray nozzles 216 may be coupled to the upper end of each exit tube 214. A high-pressure water source (not shown) is coupled in flow communication with each spray nozzle 216 to provide a continuous flow of water. Each spray nozzle 216 is oriented to spray water downwards through exit tube 214 and against the flow of the syngas. In the exemplary embodiment, each exit tube 214 is coupled to a ring-shaped manifold 218, as shown in FIGS. 3 and 4. In an alternative embodiment, manifold 218 is not ring shaped. For example, two exit tubes 214 may be coupled together to form a first conduit and the two remaining exit tubes 214 may be coupled together to form a second conduit, with the two conduits joining to form a final syngas conduit.

During operation, hot syngas flowing through the conduit formed by boiler tubes 210 contains both fine particulates and larger particles or droplets of partially solidified molten slag. With their larger momentum, the slag droplets fall into water sump 204 where they are rapidly quenched, solidified, and captured. In the exemplary embodiment, the syngas then flows into exit tubes 214. The high density, high intensity sprays from spray nozzle 216 within each exit tube 214 complete both the cooling and scrubbing of the syngas. The cooled and scrubbed syngas is then collected in manifold 218 and channeled downstream for further processing. Moreover, expansion gap 212 is either continuously or intermittently purged with an inert gas, such as nitrogen, from a gas source (not shown). The flow of purge gas downwards into spray quench chamber 202 ensures that syngas, particulate matter, and moisture do not pass upwards into expansion gap 212. As such, purging prevents fouling and plugging gap 212, and minimizes corrosion in the annular space created by boiler tubes 210 and sidewall 226.

Figure 6:
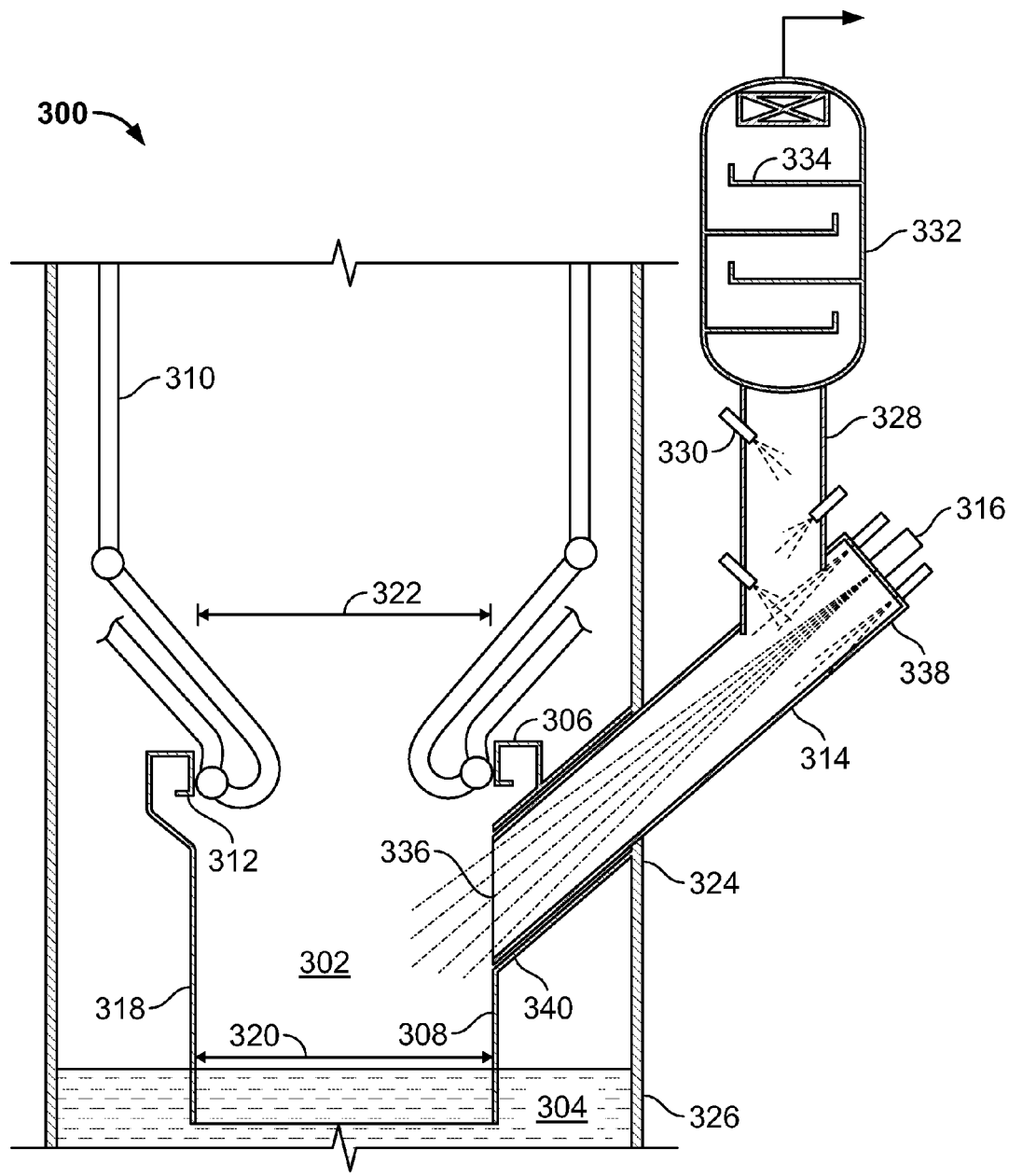
FIG. 6 is a schematic view of a second alternative spray quench that may be used with the power system shown in FIG. 1.

FIG. 6 is a schematic view of a second alternative embodiment of a spray quench 300. Specifically, FIG. 6 shows a lower portion of a radiant syngas cooler 122 that may be used with gasifier 56 (shown in FIG. 1). Radiant syngas cooler 122 includes a spray quench chamber 302 and a water sump 304. A plurality of boiler tubes 310 forms a cone which channels syngas from a chamber above (not shown) downwards into spray quench chamber 302. Alternatively, the cone may be constructed of components other than boiler tubes. For example, the cone may be a refractory-lined metal shelf or any other construction suitable for directing high temperature, slag-laden syngas into spray quench chamber 302. In an alternative embodiment, boiler tubes 310 do not form a cone but, rather, a separate cone is positioned between radiant syngas cooler 122 and spray quench chamber 202. In the exemplary embodiment, the inner surface 108 of spray quench chamber 102 (as shown in FIG. 1) is effectively moved radially inwards by using a dip tube 318 that has a diameter 320 that is approximately equal to the diameter 322 of the opening at the bottom of the boiler tubes 310. A sleeve 340 is coupled to a sidewall 324 of radiant syngas cooler 326 and further coupled to dip tube 318. In the exemplary embodiment, a quench ring 306 is coupled to dip tube 318. Quench ring 306 maintains a continuous film of water on an inner surface 308 of dip tube 318. The film of water, which drains into water sump 304, ensures that inner surface 308 remains wet to prevent slag from depositing on inner surface 308.

In the exemplary embodiment, spray quench 300 also includes at least one exit tube 314. The length of the exit tube 314 ensures the exit tube 314 extends through sleeve 340. Exit tube 314 is coupled to sidewall 324 and further to sleeve 340. As a result, boiler tubes 310 may move relative to dip tube 318 through thermal expansion, for example. An expansion gap 312 defined between boiler tubes 310 and dip tube 318 enables boiler tubes 310 to thermally expand and contract without interfering with dip tube 318. Further, exit tube 314 is oriented at a positive angle of elevation to facilitate draining any water inside exit tube 314 through an open first end 336 into water sump 304 for further processing. At a second end 338 of exit tube 314, a spray nozzle 316 is coupled and second end 338 of exit tube 314 is substantially sealed around spray nozzle 316. Alternatively, multiple spray nozzles 316 may be coupled to the second end 338 of exit tube 314. A high-pressure water source (not shown) is coupled in flow communication with each spray nozzle 316 to provide a continuous flow of water. Each spray nozzle 316 is oriented to spray water downwards through exit tube 314 and against the flow of the syngas. Moreover, a connecting tube 328 extends from exit tube 314 and is coupled to a small scrubber vessel 332. Connecting tube 328 includes at least one spray nozzle 330 that maintains a continuous film of water on the inner surface of connecting tube 328 and facilitates additional cooling and scrubbing of the syngas. A high-pressure water source (not shown) is coupled in flow communication with each spray nozzle 330 to provide a continuous flow of water. Scrubber vessel 332 includes multiple gas-water contacting trays 334 which facilitate the removal of the very finest remaining particles in the syngas. The top tray is connected to a continuous source of fresh, clean wash water (not shown) that flows downwards over each successive tray in a manner that provides at least a thin layer of water on top of each tray. Each tray contains a large number of holes through which the syngas may pass upwards and which facilitate intimate contact between the clean water and the syngas and any very fine particles which may remain in the syngas at that point. The holes in the trays may be fitted with perforated caps or mixing devices to enhance the intimate contact between the water and the syngas. The design of the trays, the holes and the fittings associated with the holes may be configured in a manner that is well known to those skilled in the art of designing tray-type gas-liquid contacting devices.

During operation, hot syngas flowing through the conduit formed by boiler tubes 310, or by some alternative construction, contains both fine particulates and larger particles or droplets of partially solidified molten slag. With their larger momentum, the slag droplets fall into water sump 304 where they are rapidly quenched, solidified, and captured. In the exemplary embodiment, the syngas then flows into exit tube 314. The high density, high intensity sprays from spray nozzle 316 within exit tube 314 facilitate cooling and scrubbing of the syngas. The partially cooled and scrubbed syngas then flows through connecting tube 328. Additional high density, high intensity sprays from spray nozzles 330 facilitate additional cooling and scrubbing of the syngas. Scrubber vessel 332 completes the cooling and scrubbing of the syngas using a polishing step using clean condensate wash water, together with a demister (not shown) to facilitate minimizing the carryover of entrained water. In addition, the annular gap 312 is either continuously or intermittently purged with an inert gas, such as nitrogen, from a gas source (not shown). The flow of purge gas downwards into spray quench chamber 302 ensures that syngas, particles, and moisture do not pass upwards into the annular space created by boiler tubes 310 and the wall 326. This purging prevents fouling and plugging of gap 312 and minimizes corrosion in the annular space created by boiler tubes 310 and wall 326.

Figure 7:
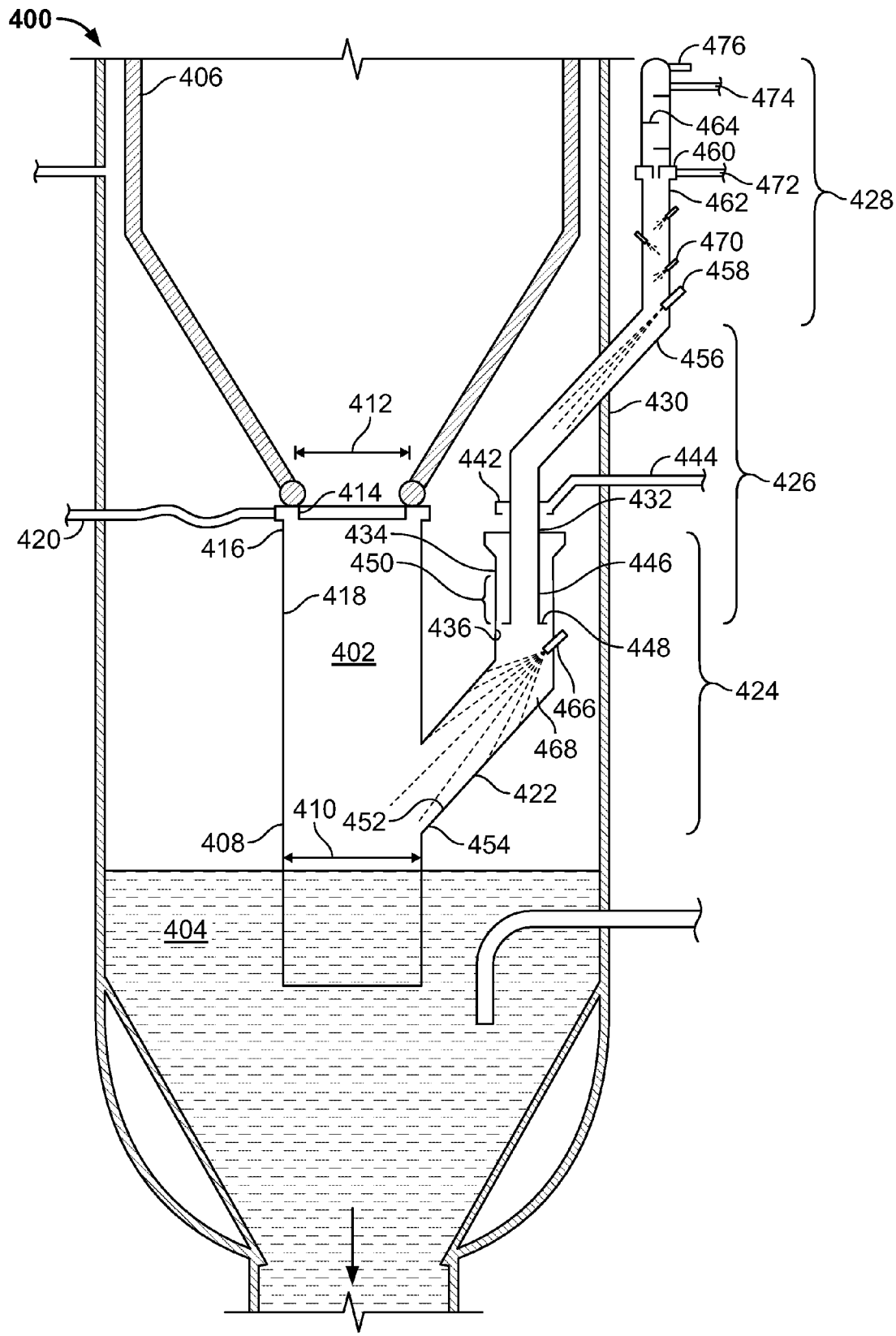
FIG. 7 is a schematic view of a third alternative spray quench that may be used with the power system shown in FIG. 1.

FIG. 7 is a schematic view of a third alternative spray quench 400. Specifically, FIG. 7 shows a lower portion of a radiant syngas cooler 122 that may be used with gasifier 56 (shown in FIG. 1). Radiant syngas cooler 122 includes a spray quench chamber 402 and a water sump 404. A plurality of boiler tubes 406 forms a cone which channels syngas from a chamber above (not shown) downwards into spray quench chamber 402. Alternatively, the cone may be constructed of components other than boiler tubes. For example, the cone may be a refractory-lined metal shelf or any other construction suitable for directing high temperature, slag-laden syngas into spray quench chamber 402. In the exemplary embodiment, the inner surface 108 of spray quench chamber 102 (as shown in FIG. 1) is effectively moved radially inwards by using a dip tube 408 that has a diameter 410 that is approximately equal to the diameter 412 of the opening at the bottom of the boiler tubes 406. Dip tube 408 is coupled at a top portion to a bottom portion of boiler tubes 406, and extends downwards so that a bottom edge of dip tube 408 remains immersed in the water in water sump 404. In the exemplary embodiment, dip tube 408 includes a quench ring 414 formed in a top end 416 of dip tube 408. Quench ring 414 maintains a continuous film of water on an inner surface 418 of dip tube 408. Water is supplied to quench ring 414 by a first conduit 420 coupled to external water supply (not shown). In the exemplary embodiment, first conduit 420 is a flexible line. The film of water, which drains into water sump 404, ensures that inner surface 418 remains wet to facilitate preventing slag from depositing on inner surface 418.

Figure 8:
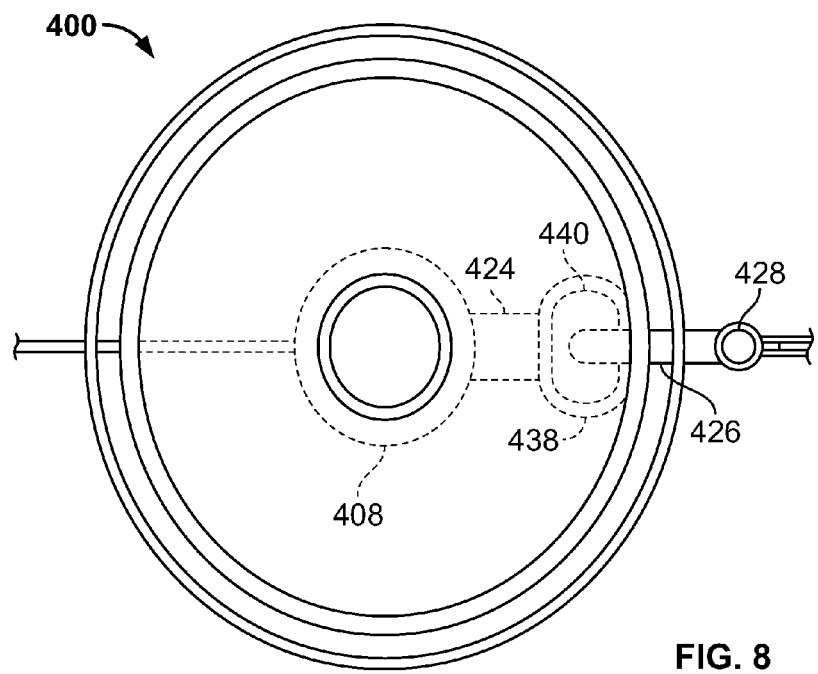
FIG. 8 is a cross-sectional view of the spray quench shown in FIG. 7.

In the exemplary embodiment, spray quench 400 also includes at least one exit tube 422. Exit tube 422 includes a first segment 424, a second segment 426, and a third segment 428. First segment 424 is fixedly coupled to dip tube 408 to enable first segment 424 to move up and/or down with dip tube 408 and boiler tubes 406 as boiler tubes 406 expand and contract due to thermal effects. Second segment 426 is fixedly coupled to a wall 430 of radiant syngas cooler 122. In the exemplary embodiment, second segment 426 is coupled to wall 430 using a flanged connection (not shown). Third segment 428 is coupled to second segment 426 and is positioned so as to be located entirely outside of radiant syngas cooler 400. In the exemplary embodiment, a lower portion 432 of second segment 426 is sized to fit inside an upper portion 434 of first segment 424 in such a way that an annular gap 436 is formed between first segment 424 and second segment 426. Annular gap 436 enables first segment 424 and second segment 426 to move relative to each other in an axial direction. Additionally, as shown in FIG. 8, first segment 424 includes a flared end 438 at upper portion 434 and second segment 426 includes a flared end 440 at lower portion 432. Flared ends 438 and 440 enable first segment 424 and segment 426 to move relative to each other in an angular direction due to thermal expansion-induced twisting of boiler tubes 120 in radiant syngas cooler 122. Moreover, a quench ring 442 is coupled to lower portion 432 of second segment 426. Quench ring 442 is supplied with water via a second conduit 444 from outside radiant syngas cooler 122. In the exemplary embodiment, second conduit 444 is a fixed pipe coupled to an external water source (not shown). Quench ring 442 distributes a film of water around an outer surface 446 of second segment 426. Further, second segment 426 includes a lip 448 that facilitates creating an obstruction between first segment 424 and second segment 426 to cause water supplied by quench ring 442 to accumulate above lip 448. The accumulated water serves as a water seal 450 between the fixed second segment 426 and the floating first segment 424. Lip 448 also distributes a film of water around an inner surface 452 of first segment 424 via annular gap 436. In an alternative embodiment, lip 448 is not present and the water seal is maintained by immersing lower portion 432 of second segment 426 in an annular pool of water contained in an upwardly projecting, annular saw-toothed weir (not shown), which is coupled to second segment 426 near water seal 450. Water continuously supplied to the weir by quench ring 442 flows underneath a bottom edge of lower portion 432 of second segment 426 and then upwards and radially inwards over the saw-teeth of the weir. Overflow water flows into the bottom portion of exit tube 422 in such a way that a film of water is maintained on the interior surfaces of exit tube 422. A bottom surface of the weir is perforated with a plurality of holes, enabling any solids that accumulate in the weir to drain out.

In the exemplary embodiment, first segment 424 is oriented at a positive angle of elevation to facilitate draining any water inside first segment 424 through an open first end 454 into water sump 404 for further processing. At an upper portion 468 of exit tube 422, a spray nozzle 466 is coupled, and upper portion 468 of exit tube 422 is substantially sealed around spray nozzle 466. Alternatively, multiple spray nozzles 466 may be coupled to the upper portion 468 of exit tube 422. A high-pressure water source (not shown) is coupled in flow communication with each spray nozzle 466 to provide a continuous flow of water. Each spray nozzle 466 is oriented to spray water downwards through exit nozzle 422 and against the flow of syngas. Furthermore, at the upper portion 456 of second segment 426, a spray nozzle 458 is coupled and upper portion 456 of second segment 426 is substantially sealed around spray nozzle 458. Alternatively, multiple spray nozzles 458 may be coupled to the upper portion 456 of second segment 426. A high-pressure water source (not shown) is coupled in flow communication with each spray nozzle 458 to provide a continuous flow of water. Each spray nozzle 458 is oriented to spray water downwards through second segment 426 and against the flow of the syngas. Moreover, third segment 428 includes at least one spray nozzle 470 that facilitates additional cooling and scrubbing of the syngas. A high-pressure water source (not shown) is coupled in flow communication with each spray nozzle 470 to provide a continuous flow of water. Third segment 428 also includes a quench ring 460 that distributes a film of clean water supplied via line 472 around an inside surface 462 of third segment 428. Further, third segment 428 includes multiple gas-water contacting trays 464 that are designed and operated similar to the gas-water contacting trays described above in FIG. 6. High pressure, clean water from a source (not shown) is fed to the gas-water contacting trays via line 474. Clean syngas which has been quenched, cooled and thoroughly scrubbed of particles exits the system via exit nozzle 476 for further processing downstream of the gasifier.

During operation, hot syngas flowing through the conduit formed by boiler tubes 406 contains both fine particulates and larger particles or droplets of partially solidified molten slag. With their larger momentum, the slag droplets fall into water sump 404 where they are rapidly quenched, solidified, and captured. In the exemplary embodiment, the syngas then flows into exit tube 422. The high density, high intensity sprays from a spray nozzle 466 within first segment 424 facilitates cooling and scrubbing of the syngas. The partially cooled and scrubbed syngas then flows through second segment 426. Additional high density, high intensity sprays from spray nozzles 458 facilitate additional cooling and scrubbing of the syngas. The syngas then flows through third segment 428. Additional high density, high intensity sprays from spray nozzles 470 facilitate further cooling and scrubbing of the syngas. Trays 464 complete the cooling and scrubbing of the syngas using a polishing step using clean condensate wash water. Moreover, if the pressure of the syngas inside radiant syngas cooler 122 quickly rises, the water in water seal 450 and the water surrounding dip tube 408 in water sump 404 will temporarily be blown out of the water-pressure-created seals, and the pressure will be relieved. Because of the constant flow of water from quench ring 414 and exit tube 422, the water is quickly replenished, restoring the water-pressure-created seals.

Figure 9:
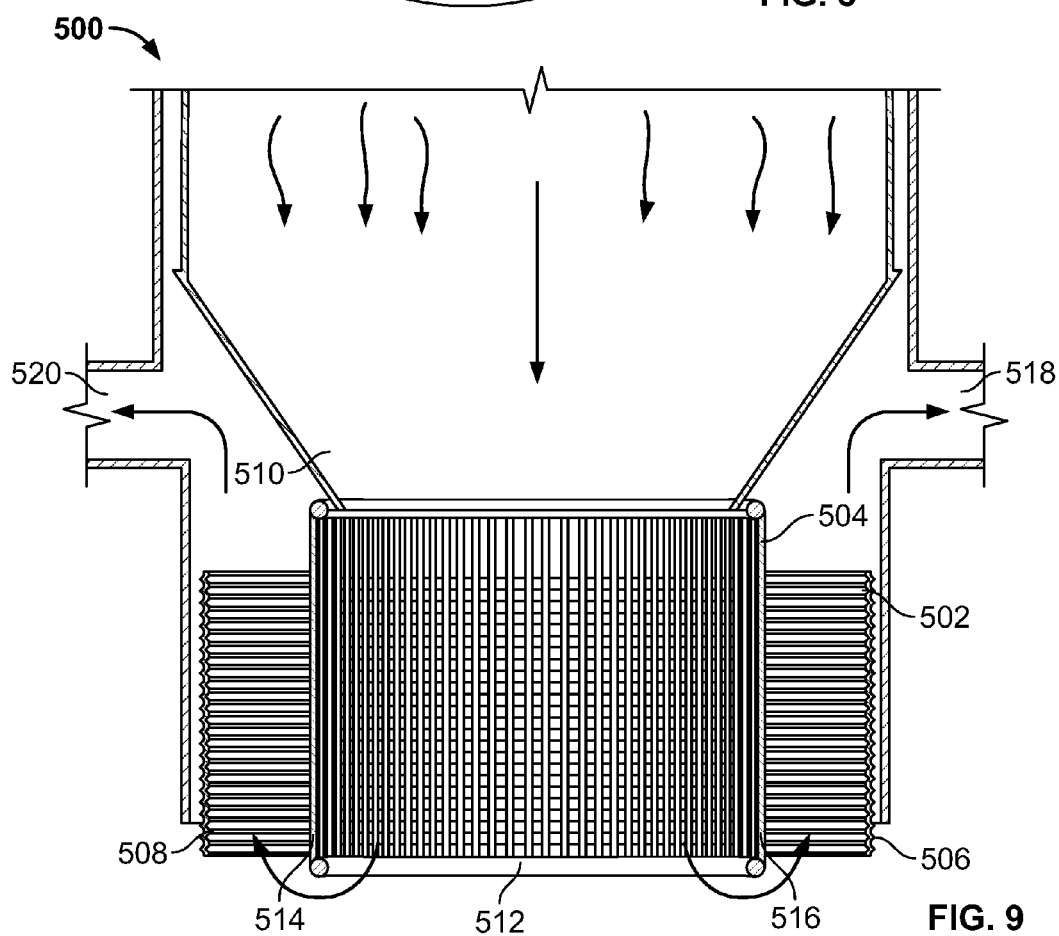
FIG. 9 is a schematic view of a fourth alternative spray quench that may be used with the power system shown in FIG. 1.

FIG. 9 is a schematic view of a fourth alternative spray quench 500. In the exemplary embodiment, spray quench 500 is positioned within a radiant syngas cooler, such as radiant syngas cooler 122 (shown in FIG. 1), and includes a first wall 502 and a second wall 504 positioned radially inward from first wall 502. First wall 502 includes a plurality of spray nozzles 506 positioned along an inner surface 508 of first wall 502 and at a predetermined interval from a top end 510 of spray quench 500 to an opposite bottom end 512. Second wall 504 includes a plurality of spray nozzles 506 positioned along an outer surface 514 and an inner surface 516 of second wall 504 and at a predetermined interval from top end 510 of spray quench 500 to bottom end 512. Moreover, in the exemplary embodiment, spray quench 500 includes a first exit 518 and an opposite second exit 520. In an alternative embodiment, spray quench 500 includes only a first exit 518.

Figure 10:
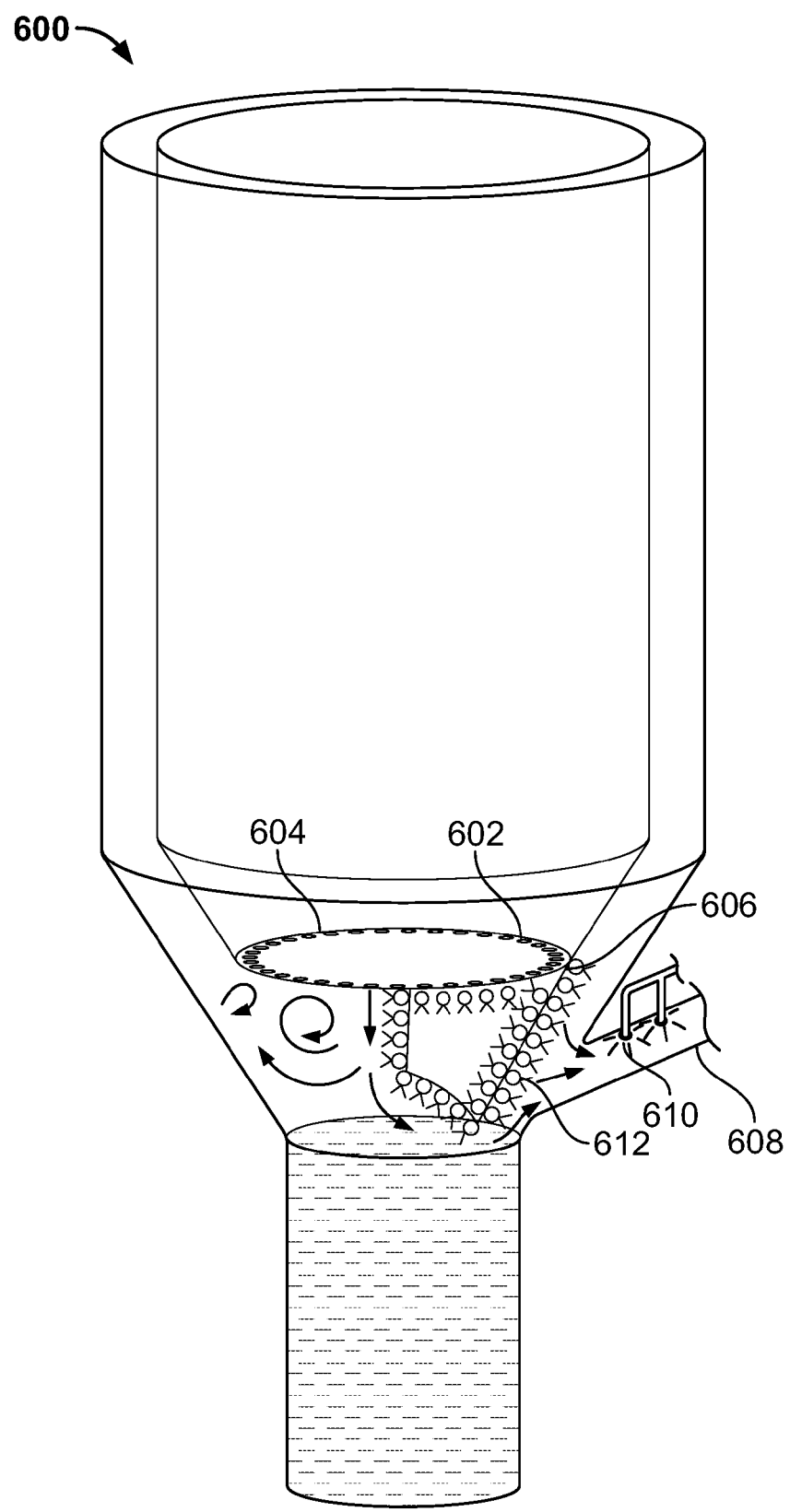
FIG. 10 is a schematic view of a fifth alternative spray quench that may be used with the power system shown in FIG. 1.

FIG. 10 is a schematic view of a fifth alternative spray quench 600. In the exemplary embodiment, spray quench 600 includes a spray ring 602 coupled to a cone that channels syngas downwards into spray quench chamber 602. Alternatively, the cone may be constructed of components other than boiler tubes. For example, the cone may be a refractory-lined metal shelf or any other construction suitable for directing high temperature, slag-laden syngas into spray quench chamber 602. In the exemplary embodiment, a plurality of spray nozzles 604 is coupled to spray ring 602. Hot syngas exits the cone and flows through the water spray from spray nozzles 604, thereby cooling and scrubbing the syngas. A baffle 606 is located between spray nozzles 604 and an exit tube 608. Baffle 606 facilitates forcing the syngas to flow through a plurality of spray nozzles 612 coupled to spray quench 600, further cooling and scrubbing the syngas. Alternative embodiments of spray quench 600 may include fewer or more baffles 606. Moreover, alternative embodiments of spray quench 600 may include baffles 606 arranged differently than shown in the exemplary embodiment. In the exemplary embodiment, spray quench 600 also includes a plurality of sprays 610 positioned within exit tube 608 to facilitate additional cooling and scrubbing of the syngas.

During operation, hot syngas flowing through the conduit formed by the boiler tubes contains both fine particulates and larger particles or droplets of partially solidified molten slag. With their larger momentum, the slag droplets fall into a water sump, such as water sump 104 (shown in FIG. 1), where they are rapidly quenched, solidified, and captured. Syngas exits the cone and flows through spray ring 602, wherein the syngas is cooled and scrubbed by the water sprays from spray nozzles 604. Syngas exiting spray ring 602 is then channeled by baffle 606 through additional spray nozzles 612 as the syngas flows towards exit tube 608. The syngas then flows through exit tube 608, wherein the syngas is subjected to additional water sprays from spray nozzles 610.

Figure 11:
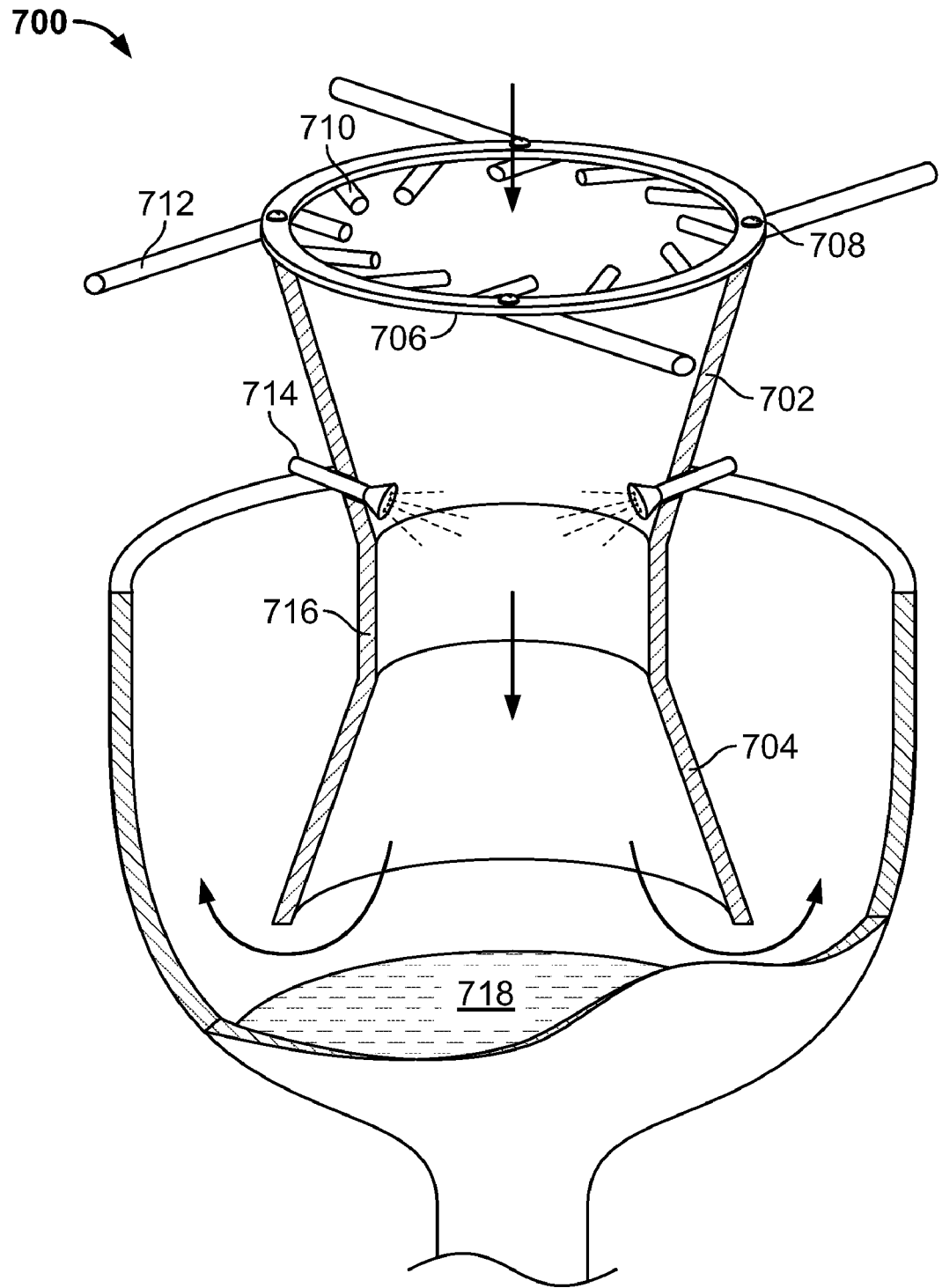
FIG. 11 is a schematic view of a sixth alternative spray quench that may be used with the power system shown in FIG. 1.

FIG. 11 is a schematic view of an sixth alternative spray quench 700. In the exemplary embodiment, spray quench 700 includes a converging cone 702 and a diverging cone 704 coupled to converging cone 702. A throat 716 is defined at the point where converging cone 702 and diverging cone 704 meet. A spray quench ring 706 is coupled to a top end 708 of converging cone 702. Spray quench ring 706 includes a plurality of spray nozzles 710. In the exemplary embodiment, the plurality of spray nozzles 710 is positioned circumferentially about spray quench ring 706. More specifically, spray nozzles 710 are oriented about spray quench ring 706 such that each spray nozzle 710 is positioned equidistantly from each adjacent spray nozzle 710. Moreover, in the exemplary embodiment, each spray nozzle 710 is oriented at a predetermined angle to facilitate creating a vortex flow as syngas flows through spray quench ring 706. In addition, spray quench ring 706 is supplied with water via a plurality of water supply lines 712 coupled in flow communication with a water source (not shown). In the exemplary embodiment, the plurality of water supply lines 712 is positioned circumferentially about spray quench ring 706. More specifically, each water supply line 712 is positioned approximately 90 degrees from the next water supply line 712. In the exemplary embodiment, spray quench 700 also includes a plurality of spray nozzles 714.

During operation, hot syngas flowing through the conduit formed by the boiler tubes (not shown) contains both fine particulates and larger particles or droplets of partially solidified molten slag. With their larger momentum, the slag droplets fall into a water sump 718, where they are rapidly quenched, solidified, and captured. The syngas flows through spray quench ring 706 where it is cooled and scrubbed by water from spray nozzles 710. The position and angular orientation of spray nozzles 710 forces the syngas into a vortex flow, thereby increasing the velocity of the syngas as it contacts the water, which facilitates additional cooling and scrubbing. As the syngas approaches throat 716 it is subjected to additional cooling and scrubbing by spray nozzles 714, creating a mix of syngas and water. Diverging cone 704 acts as a diffuser to reduce the speed of flow of the syngas, facilitating additional exposure to the water.

Figure 12:
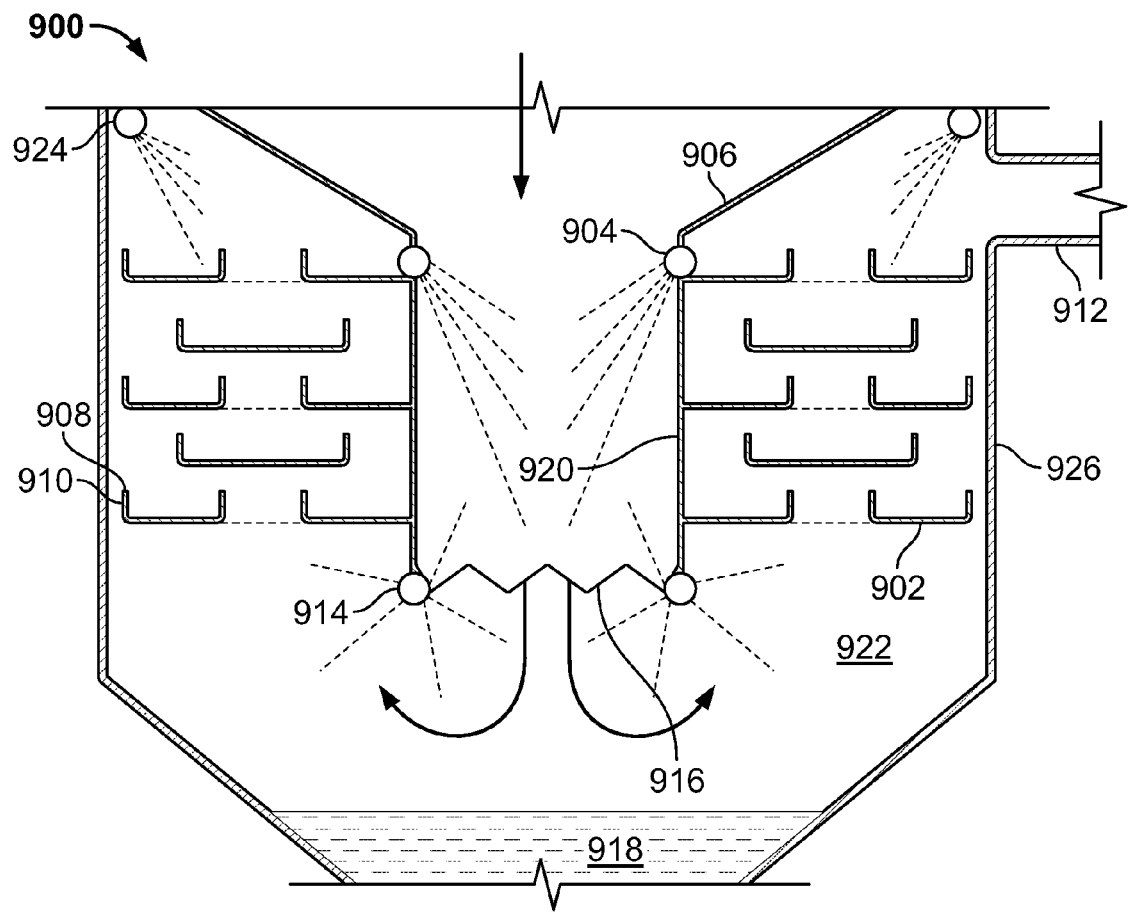
FIG. 12 is a schematic view of a seventh alternative spray quench that may be used with the power system shown in FIG. 1.

FIG. 12 is a schematic view of an seventh alternative spray quench 900. In the exemplary embodiment, syngas flows through the cone formed by boiler tubes 906 and enters flow conduit 920, which directs the syngas downwards towards a water-filled sump 918. A plurality of water spray nozzles 904 located around the periphery of the top edge of conduit 920 facilitates cooling and scrubbing of the syngas as it passes through the conduit. A plurality of water spray nozzles 914 located around the periphery of the bottom edge of conduit 920 facilitates cooling and scrubbing of the syngas in the bottom portion of the conduit as well as in the space between the bottom edge 916 of the conduit and the water sump 918. The bottom edge 916 of conduit 920 has a saw-tooth configuration that facilitates an even distribution of syngas as it exits the conduit and passes into the annular space 922 formed by the outer surface of the flow conduit 920 and the wall of the spray quench chamber 926. The annular space 922 contains a plurality of trays 902 and a plurality of spray nozzles 924. The spray nozzles 924 continuously supply water to trays 902 to maintain the water level and water purity of the water held by trays 902. As each tray 902 passes a fill level defined by a top edge 908 of a tray wall 910, water spills out of tray 902, forming a waterfall. As the syngas flows among trays 902 towards an exit tube 912, the syngas passes through the waterfalls and is further cooled and scrubbed. In one embodiment, each tray 902 includes a plurality of holes (not shown). In such an embodiment, syngas passes through the water held by tray 902 and through the holes. In an alternative embodiment, trays 902 include a lip (not shown) to facilitate maintaining a constant water level in trays 902.

During operation, hot syngas flowing through the conduit formed by boiler tubes 906 contains both fine particulates and larger particles or droplets of partially solidified molten slag. With their larger momentum, the slag droplets fall into water sump 918, where they are rapidly quenched, solidified, and captured. As the syngas, particulates, and slag droplets flow downwards through the syngas flow conduit 920, they are cooled and quench by the water from spray nozzles 904 and 914. The syngas exiting the bottom of syngas flow conduit 920 reverses direction and is directed between trays 902 and through holes defined in trays 902. While flowing between trays 902, the syngas is cooled and scrubbed by water from spray nozzles 924 and also by waterfalls formed from water overflowing from trays 902.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

The above-described methods and apparatus provide a simple and robust means of cooling syngas and removing entrained particulates in a manner suitable for use in a radiant-only syngas cooler configuration. The flow rates and spatial densities of the various sprays can be controlled to ensure that the desired level of quenching and particulate scrubbing is achieved in all cases. The designs ensure that all surfaces within the spray quench chamber are maintained with at least a thin film of water at all times, thereby preventing slag deposits from accumulating on any of the surfaces and avoiding the maintenance expense and plant down time associated with such deposits. Furthermore, the methods and apparatus described above simplify the equipment required for syngas cooling and particle removal by incorporating all quenching and particulate removal functions into the spray quench chamber itself, thus eliminating the need for a large, separate syngas scrubber vessel.

Exemplary embodiments of gasification systems and methods of incorporating a radiant syngas cooler including a spray quench into a gasifier to cool the syngas within the gasifier are described above in detail. The gasification system components illustrated are not limited to the specific embodiments described herein, but rather components of each system may be utilized independently and separately from other components described herein. For example, the gasification system components described above may also be used in combination with different system components. Moreover, it will be appreciated by one skilled in the art that while the preceding exemplary embodiments have been described in relation to spray quenching of hot syngas exiting the bottom of a radiant syngas cooler, the various embodiments may also be coupled directly to a gasifier reaction chamber without the intervening radiant syngas cooler in order to provide immediate quenching of the hot syngas without the use of a first indirect heat removal step in the form of a radiant syngas cooler. Further, it will be appreciated by one skilled in the art that, in all of the embodiments described above, means are provided for periodically removing from the system any slag which accumulates in the water sump by means of a suitable device such as a lock hopper or a solids pump and that, furthermore, the spray and scrubbing water that accumulates in the water sump is continuously blown down from that sump in a controlled manner so as to maintain a steady water level in the sump.

While the invention has been described in terms of various specific embodiments, those skilled in the art will recognize that the invention can be practiced with modification within the spirit and scope of the claims.

What is claimed is:

1. A method of assembling a spray quench apparatus, said method comprising:
   coupling a first end of at least one syngas exit tube to a quench chamber such that the exit tube end is in flow communication with the quench chamber;
   coupling at least one spray nozzle to an opposite second end of the at least one exit tube such that water emitted from the at least one spray nozzle fills the at least one exit tube and forms a film of water across an inner surface of the at least one exit tube;
   coupling a water source to the quench chamber for providing a substantially continuous water film along an inner surface of the quench chamber; and
   coupling at least one discharge apparatus to the quench chamber for providing water spray into the quench chamber, wherein the water of the water film and water sprays drains into a water sump.

2. A method in accordance with claim 1 wherein the water source is coupled to the quench chamber via a quench ring, and wherein coupling at least one discharge apparatus to the quench chamber further comprises coupling at least one spray ring to the quench ring, wherein the spray ring includes a plurality of spray nozzles.

3. A method in accordance with claim 1 further comprising coupling a dip tube to the first end of the at least one exit tube such that the quench chamber is effectively moved radially inwards, wherein the dip tube has a diameter approximately equal to a diameter of an opening at a bottom of a radiant syngas cooler positioned above the dip tube, and wherein one or more quench rings attached to the dip tube maintain a continuous film of water over an interior surface of the dip tube.

4. A method in accordance with claim 1 wherein coupling a first end of at least one exit tube to a quench chamber comprises:
   coupling a first end of a connecting tube to the second end of the at least one exit tube such that the connecting tube extends upward from the at least one exit tube;
   coupling an opposite second end of the connecting tube to a scrubber vessel having a plurality of syngas-water contacting trays; and
   coupling at least one spray nozzle within the connecting tube to facilitate maintaining a water film across an inner surface of the connecting tube.

5. A method in accordance with claim 1 further comprising coupling a dip tube directly to a bottom of a vessel positioned above the dip tube such that the quench chamber is effectively moved radially inward, and wherein coupling a first end of at least one exit tube to a quench chamber further comprises:
   coupling a first end of a first exit tube segment to the quench chamber, wherein the first segment includes a flared second end and at least one spray nozzle;
   inserting a second exit tube segment into the first exit tube segment, wherein the second segment includes at least one of a spray nozzle, a quench ring, and a lip that facilitates forming a water seal between the first segment and the second segment; and
   coupling a third exit tube segment to the second exit tube segment, wherein the third segment includes at least one spray nozzle, a quench ring, and a plurality of scrubbing trays, wherein the scrubbing vessel, the dip tube, and the first exit tube segment are axially and tangentially moveable with respect to the second exit tube segment.

6. A method in accordance with claim 1 wherein the quench chamber includes an inner first wall and an outer second wall, said method further comprises coupling a plurality of spray nozzles to a surface of at least one surface of each of the first wall and the second wall such that each spray nozzle of the plurality of spray nozzles is spaced a distance from each other spray nozzle.

7. A method in accordance with claim 1 further comprising coupling at least one baffle to the quench chamber, wherein the at least one baffle is configured to channel syngas through a plurality of water sprays.

8. A method in accordance with claim 1 further comprising:
   coupling a converging cone to the quench chamber;
   coupling a diverging cone to the converging cone; and
   coupling a plurality of spray nozzles to the converging cone and to the diverging cone.

9. A method in accordance with claim 1 further comprising:
   coupling a flow conduit directly to a bottom of a vessel positioned above the flow conduit such that the quench chamber is effectively divided into a central down flow passage and an annular upflow passage, wherein the down flow passage and the upflow passage are disposed a certain distance above a water sump;
   coupling a plurality of perforated scrubbing trays to an outer surface of the flow conduit, wherein the plurality of scrubbing trays are oriented to channel syngas through a plurality of waterfalls; and
   coupling a plurality of spray nozzles to an inner surface of the flow conduit, the outer surface of the flow conduit, and a sidewall of the quench chamber, wherein each nozzle of the plurality of spray nozzles is positioned to facilitate maintaining a water level in each tray of the plurality of scrubbing trays.

10. A spray quench apparatus comprising:
    a chamber;
    at least one spray apparatus comprising at least one spray nozzle coupled to said chamber;
    at least one water distribution apparatus coupled to said chamber for providing a layer of liquid across an inner surface of said chamber; and
    at least one hollow cylinder comprising a first end and an opposite second end, said first end is coupled to said chamber such that an opening in said first end enables syngas to exit said chamber through said hollow cylinder; said
    at least one spray nozzle coupled to said second end of said hollow cylinder for providing a water spray that fills said hollow cylinder and a water film across an inner surface of said hollow cylinder, wherein the water of the water sprays and the water film drains into a water sump positioned at a bottom of said chamber.

11. A spray quench apparatus in accordance with claim 10 further wherein said water distribution apparatus comprises a spray ring coupled to said chamber, said spray ring comprises a plurality of nozzles.

12. A spray quench apparatus in accordance with claim 10 further comprising a dip tube having a diameter approximately equal to a diameter defined by an opening at a bottom of a vessel coupled to a top of said chamber, wherein said at least one hollow cylinder extends inward in order to couple to said dip tube such that an inner surface of said chamber is effectively moved radially inwards.

13. A spray quench apparatus in accordance with claim 10 further comprising a connecting tube coupled at a first lower end to said hollow cylinder second end and coupled at an upper second end to a scrubber vessel comprising a plurality of syngas-water contacting trays, wherein said connecting tube comprises at least one spray nozzle that maintains a film of water across an inner surface of said connecting tube.

14. A spray quench apparatus in accordance with claim 10 further comprising a dip tube coupled to a bottom of a vessel positioned above said dip tube such that an inner surface of said chamber is effectively moved radially inwards, wherein said at least one hollow cylinder further comprises:
  a first segment coupled to said chamber, wherein said first segment comprises at least one spray nozzle configured to provide a water spray to said first segment and to provide a film of water across an inner surface of said first segment;
  a second segment inserted into said first segment such that said chamber and said first segment are independently moveable with respect to said second segment, wherein said second segment comprises a spray nozzle, a quench ring, and a lip configured to form a seal between said second segment and said first segment; and
  a third segment comprising at least one spray nozzle, a quench ring, and a plurality of scrubbing trays, wherein said third segment is coupled to said second segment.

15. A spray quench apparatus in accordance with claim 10 further comprising:
  a first wall coupled to said chamber;
  a second wall coupled to said chamber; and
  a plurality of spray nozzles coupled to at least one surface of each of said first and second walls, such that each of said spray nozzles is spaced a distance from each other spray nozzle.

16. A spray quench apparatus in accordance with claim 10 further comprising at least one baffle coupled to said chamber, said baffle is configured to channel syngas through at least one of a plurality of water sprays and a plurality of waterfalls.

17. A spray quench apparatus in accordance with claim 10 further comprising:
  a converging cone coupled to a top of said chamber;
  a diverging cone coupled to a bottom of said converging cone, thereby defining a throat area; and
  a plurality of spray nozzles coupled to said converging cone and to said diverging cone.

18. A spray quench apparatus in accordance with claim 10 further comprising:
  a flow conduit defining a central flow down passage and an up flow annular passage between said flow conduit and said chamber;
  a plurality of perforated scrubbing trays coupled to said flow conduit, wherein said plurality of scrubbing trays are oriented to channel syngas through a plurality of waterfalls; and
  a plurality of spray nozzles coupled to said flow conduit and a sidewall of said chamber, wherein each nozzle of said plurality of spray nozzles is positioned to facilitate maintaining a water level in each tray of said plurality of scrubbing trays and to fill the annular space defined by said flow conduit and said sidewall with water spray.

19. A gasifier comprising:
  a reaction chamber; and
  a spray quench chamber coupled to a bottom of said reaction chamber, wherein said spray quench chamber comprises:
    at least one water distribution apparatus for distributing a substantially continuous film across an inner surface of said spray quench chamber;
    at least one spray discharge apparatus comprising at least one spray nozzle for spraying water into said spray quench chamber; and
    at least one syngas exit tube comprising a first end and an opposite second end, wherein said first end is coupled to a sidewall of said spray quench chamber; said
    at least one spray nozzle coupled to said second end of said at least one exit tube, wherein said at least one spray nozzle sprays water into said at least one exit tube and maintains a film of water across an inner surface of said at least one exit tube, and wherein the water of the water sprays and the water film drains into a water sump at a bottom of said spray quench chamber.

20. A gasifier in accordance with claim 19 further wherein said water distribution apparatus comprises a spray ring coupled to said spray quench chamber, wherein said spray ring comprises a plurality of spray nozzles.

21. A gasifier in accordance with claim 19 further comprising a dip tube having a diameter approximately equal to a diameter of an opening of said reaction chamber bottom, wherein said at least one exit tube is coupled to said dip tube such that said inner surface of said spray quench chamber is effectively moved radially inward.

22. A gasifier in accordance with claim 19 further comprising a connecting tube coupled at a first lower end to said exit tube second end and coupled at an upper second end to a scrubber vessel comprising a plurality of syngas-water contacting trays, wherein said connecting tube comprises at least one spray nozzle that maintains a film of water across an inner surface of said connecting tube.

23. A gasifier in accordance with claim 19 further comprising a dip tube coupled to said reaction chamber bottom such that an inner surface of said spray quench chamber is effectively moved radially inwards, wherein said at least one exit tube further comprises:
  a first segment coupled to said spray quench chamber, wherein said first segment comprises at least one spray nozzle configured to provide a water spray to said first segment and to provide a film of water across an inner surface of said first segment;
  a second segment inserted into said first segment, wherein said second segment comprises at least one spray nozzle, a quench ring, and a lip configured to form a water seal between said second segment and said first segment; and
  a third segment comprising at least one spray nozzle, a quench ring, and a plurality of scrubbing trays, wherein said third segment is coupled to said second segment.

24. A gasifier in accordance with claim 19 further comprising:
  a first wall coupled to said spray quench chamber;
  a second wall coupled to said spray quench chamber; and
  a plurality of spray nozzles coupled to at least one surface of each of said first and second walls, such that each of said spray nozzles is spaced a distance from each other spray nozzle.

25. A gasifier in accordance with claim 19 further comprising at least one baffle coupled to said spray quench chamber, said baffle is configured to channel syngas through at least one of a plurality of spray nozzles and a plurality of waterfalls.

26. A gasifier in accordance with claim 19 further comprising:
- a converging cone coupled to a top of said spray quench chamber;
- a diverging cone coupled to a bottom of said converging cone, wherein said converging cone and said diverging cone define a throat area; and
- a plurality of spray nozzles coupled to said converging cone and to said diverging cone.

27. A gasifier in accordance with claim 19 further comprising:
- a flow conduit defining a central flow down passage and an up flow annular passage between said flow conduit and said spray quench chamber;
- a plurality of perforated scrubbing trays coupled to said flow conduit, wherein said plurality of scrubbing trays are oriented to channel syngas through a plurality of waterfalls; and
- a plurality of spray nozzles coupled to an inner surface of said flow conduit, and an outer surface of said flow conduit, and a sidewall of said spray quench chamber, wherein each nozzle of said plurality of spray nozzles is positioned to facilitate maintaining a water level in each tray of said plurality of scrubbing trays.

28. A gasifier in accordance with claim 19 further comprising a radiant syngas cooler positioned between said reaction chamber and said spray quench chamber, wherein said radiant syngas cooler is coupled to a bottom of said reaction chamber and a top of said spray quench chamber.

* * * * *